United States Patent
Thomas

(10) Patent No.: US 6,341,805 B1
(45) Date of Patent: Jan. 29, 2002

(54) VEHICLE EXHAUST SYSTEM WITH IMPROVED PIPE END CONFIGURATIONS

(75) Inventor: R. Winfield Thomas, West Lebanon, IN (US)

(73) Assignee: Tru-Flex Metal Hose Corp, West Lebanon, IN (US)

(*) Notice: Subject to any disclaimer, the term of this patent is extended or adjusted under 35 U.S.C. 154(b) by 0 days.

(21) Appl. No.: 09/040,083

(22) Filed: Mar. 17, 1998

(51) Int. Cl.$^7$ ................................................ F16L 27/11
(52) U.S. Cl. .......................... 285/229; 285/226; 285/49; 285/236
(58) Field of Search ................................ 285/226, 227, 285/228, 229, 236, 235, 115, 49, 903, 369, 417; 60/322

(56) References Cited

U.S. PATENT DOCUMENTS

| | | | | |
|---|---|---|---|---|
| 2,420,153 A | * | 5/1947 | Sprenger et al. | ............ 285/235 |
| 2,538,683 A | * | 1/1951 | Guiler et al. | |
| 3,549,176 A | * | 12/1970 | Contreras | |
| 3,727,951 A | * | 4/1973 | Shire et al. | |
| 3,869,151 A | * | 3/1975 | Fletcher | .................. 285/226 X |
| 3,938,834 A | * | 2/1976 | Oostenbrink | ................ 285/235 |
| 4,315,558 A | * | 2/1982 | Katayama | |
| 4,536,019 A | * | 8/1985 | Quaranta | |
| 4,732,413 A | * | 3/1988 | Bachmann et al. | ..... 285/229 X |
| 4,827,890 A | * | 5/1989 | Pociask et al. | ......... 285/236 X |
| 4,998,597 A | * | 3/1991 | Bainbridge et al. | |
| 5,145,215 A | * | 9/1992 | Udell | ...................... 285/226 X |
| 5,791,696 A | * | 8/1998 | Miyajima et al. | ........... 285/226 |

FOREIGN PATENT DOCUMENTS

| | | | | |
|---|---|---|---|---|
| FR | 2386765 | * | 12/1978 | .................. 285/229 |
| GB | 571022 | * | 8/1945 | .................. 285/227 |

* cited by examiner

*Primary Examiner*—Teri Pham Luu
(74) *Attorney, Agent, or Firm*—Shughart Thomson & Kilroy P.C.; Mark E. Brown

(57) ABSTRACT

An exhaust piping system is provided for a vehicle with an internal combustion engine and an exhaust system including an emission control device. The exhaust piping system includes an exhaust pipe connected to the engine and an emission pipe connected to the emission control device. The exhaust and emission pipes include ends which are tapered to form reduced outside diameters. A flexible hose coupling includes a bore which telescopically receives the exhaust and emission pipe ends. First and second annular clearances are formed between the reduced-diameter pipe ends and the flexible hose coupling bore, which clearances reduce wearing and abrasion of the flexible hose coupling associated with vibration and relative movement between the pipe ends and the flexible hose coupling.

8 Claims, 8 Drawing Sheets

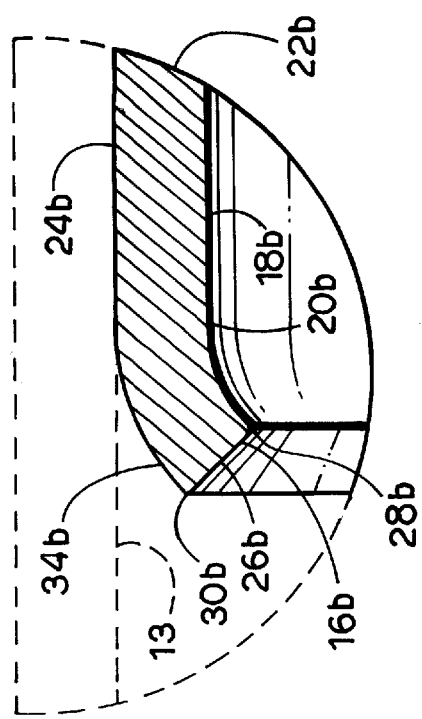
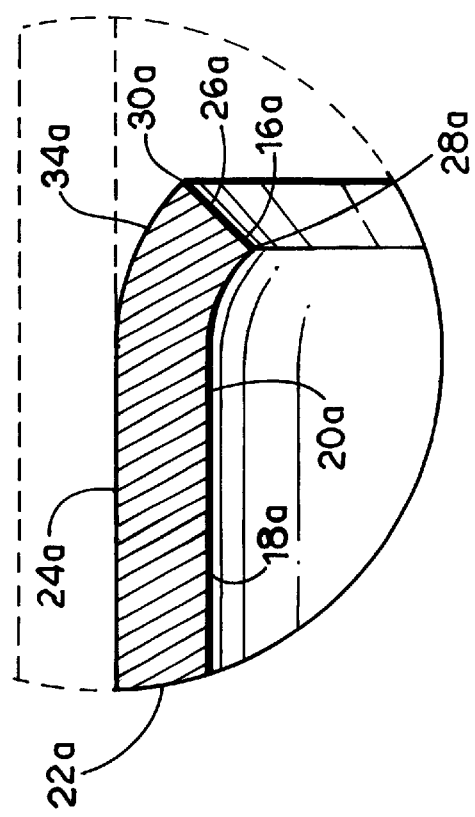

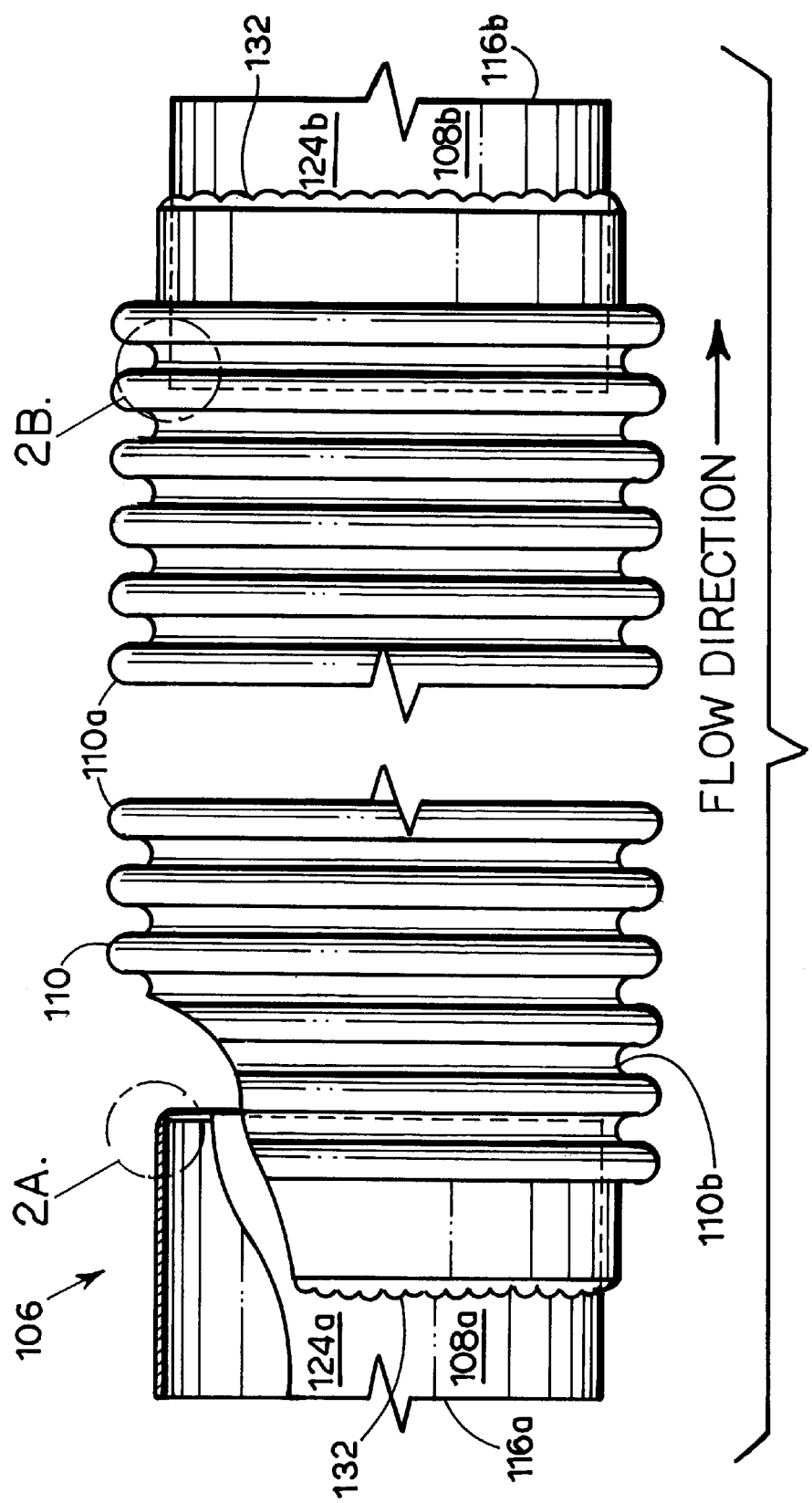

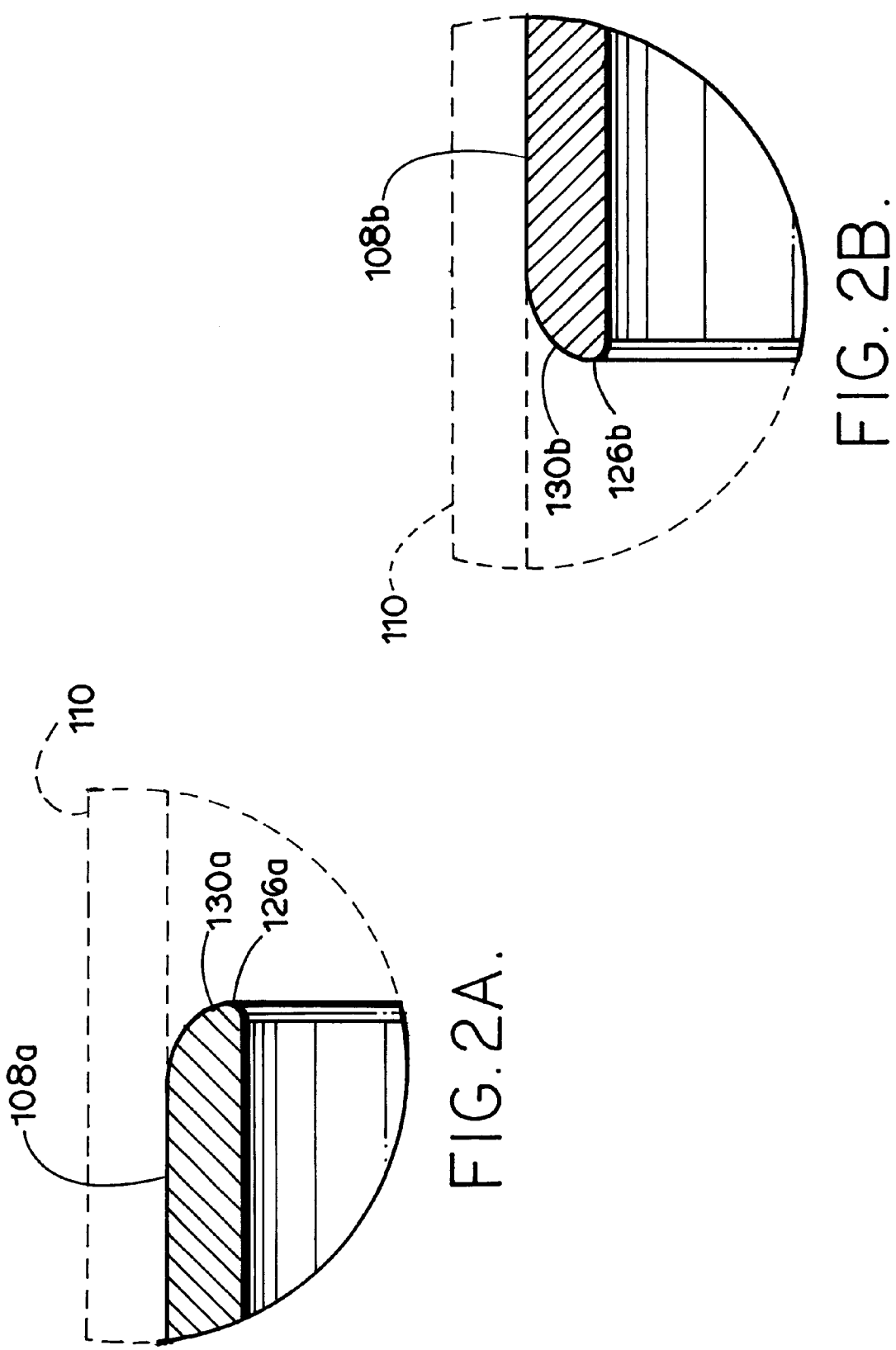

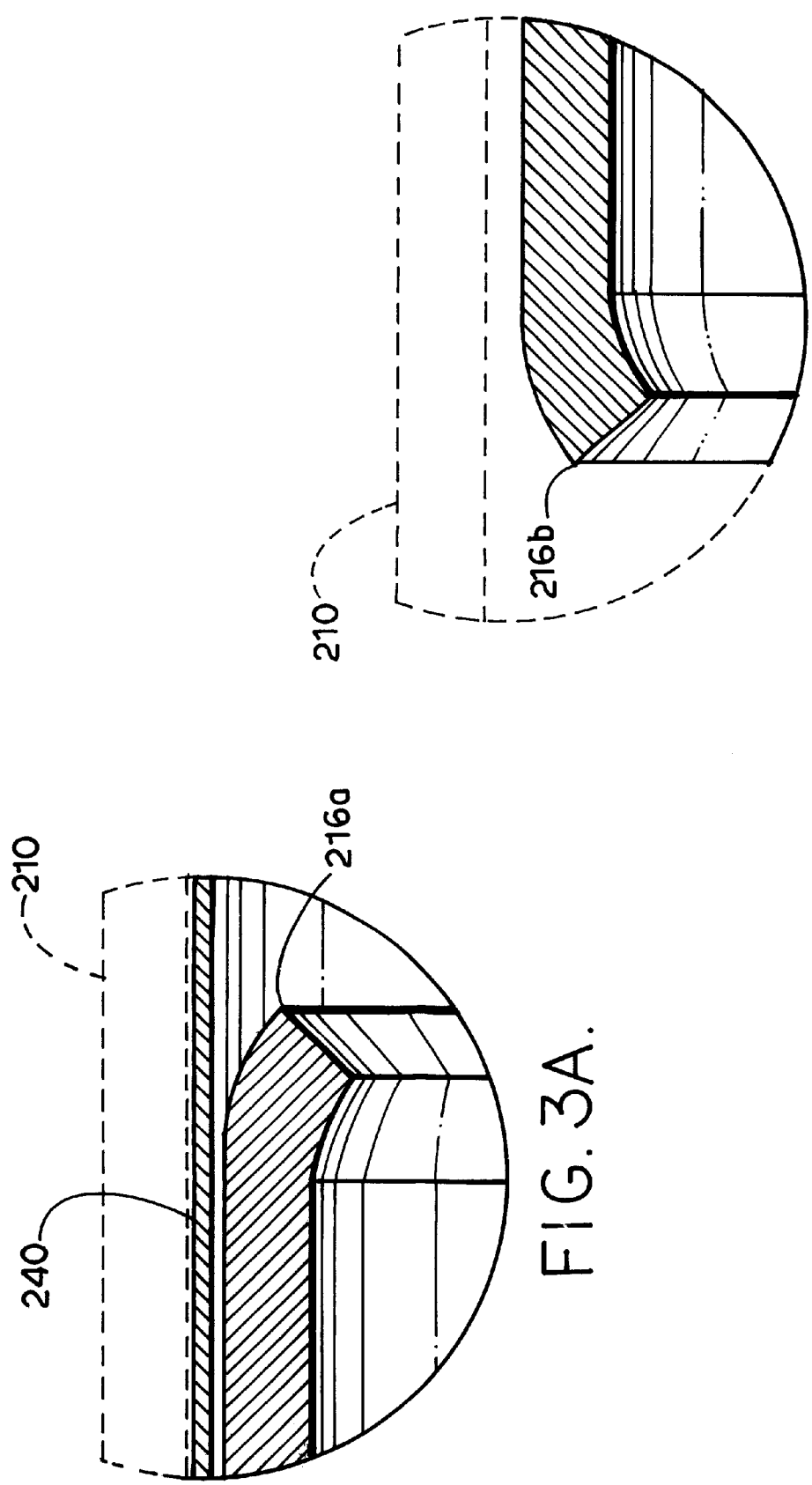

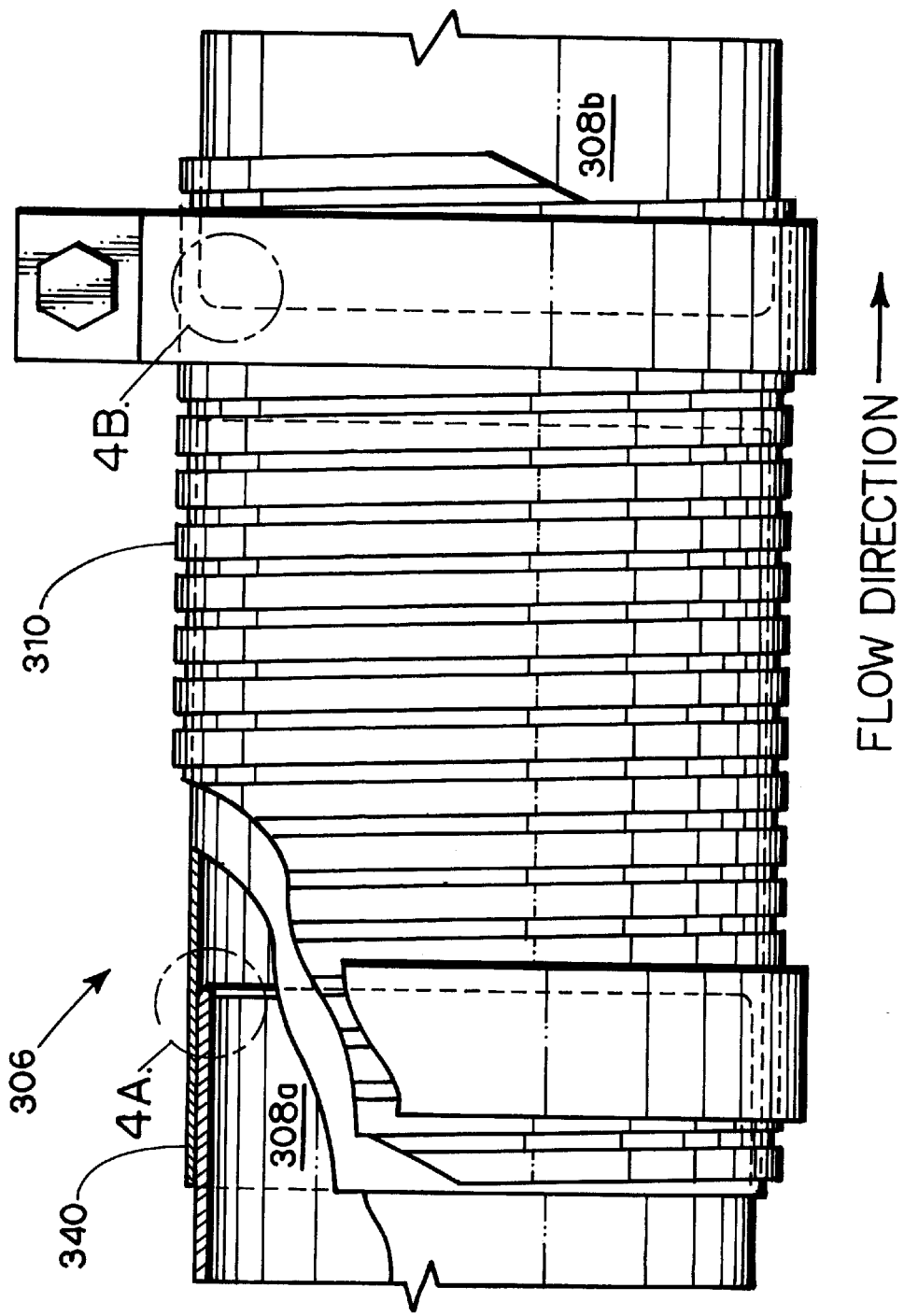

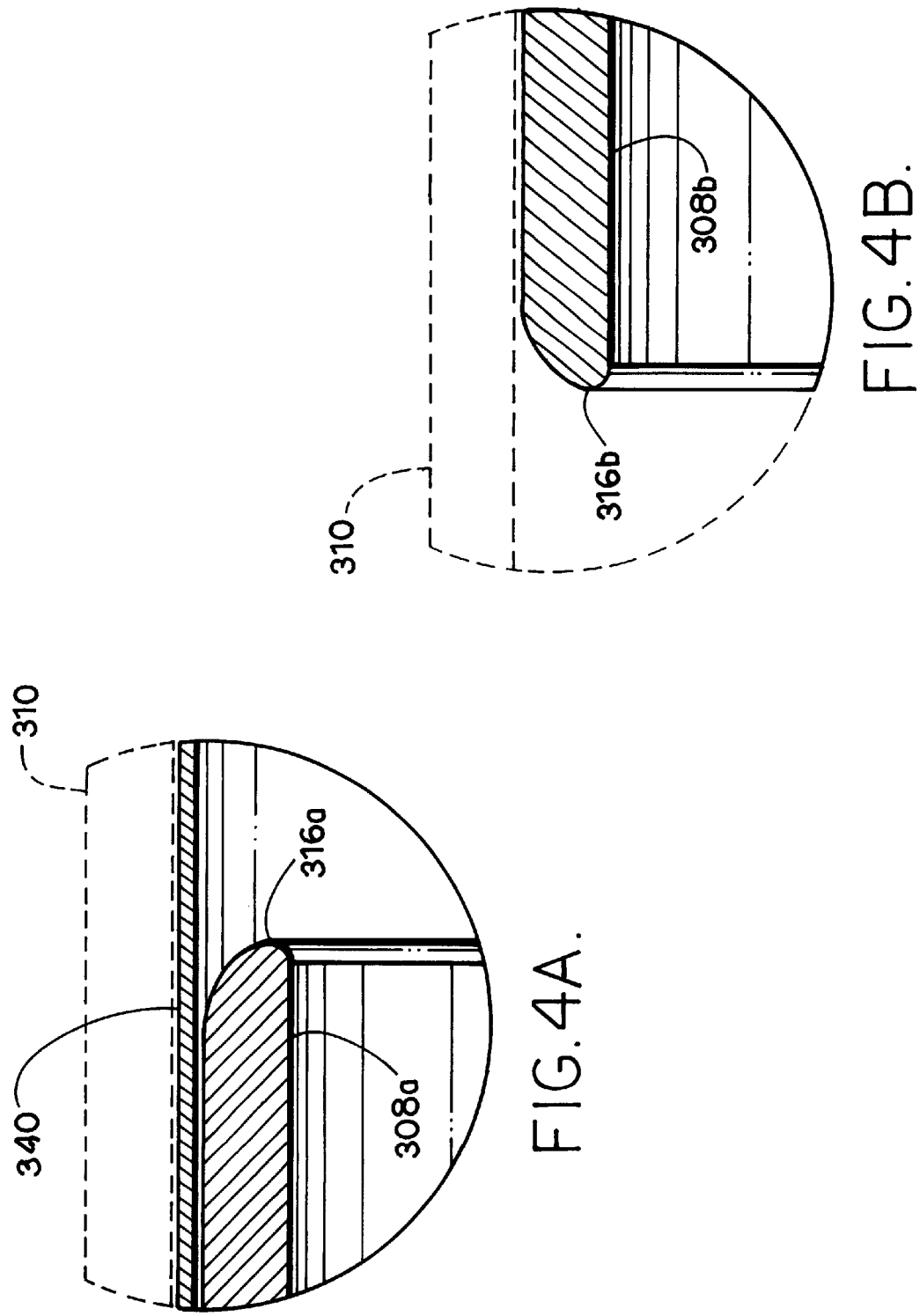

VEHICLE EXHAUST SYSTEM WITH IMPROVED PIPE END CONFIGURATIONS

BACKGROUND OF THE INVENTION

1. Field of the Invention

The present invention relates generally to vehicles with internal combustion engines, and in particular to an exhaust system therefor with improved pipe end configurations.

2. Description of the Prior Art

Exhaust systems for internal combustion engines convey hot exhaust gases and the byproducts of combustion from the engine to the ambient atmosphere via various suitable emissions control devices such as mufflers, resonators, catalytic converters and the like. Exhaust systems are subjected to thermal stresses associated with the handling of hot exhaust gases and vibration stresses from vibration sources such as the engine and the operation of the vehicle over the road. Due at least partly to being subjected to such stresses, exhaust systems tend to require periodic repair and replacement of the entire systems and individual components thereof. Exhaust system repair and component replacement are factors in vehicle operating costs.

Vehicle and vehicle parts warranties often require repair or replacement of unserviceable systems, including exhaust systems, which fail within predetermined warranty periods. Exhaust systems and their components can cause significant warranty expenses to be incurred. Thus, an improved exhaust system with components having longer service lives could reduce warranty claim expenses and vehicle operating costs. Engines equipped with certain performance and/or efficiency enhancing features, such as turbochargers and the like, often require more frequent exhaust system components replacement due to higher exhaust gas temperatures than conventional internal combustion engines.

An important consideration in the design of exhaust system components is, therefore, to maximize longevity in service in order to minimize frequency of replacement. Various exhaust system designs have previously been proposed in an attempt to satisfy one or more of these criteria. For example, exhaust systems have been produced with rigid pipes, spiral-wound flexible hose, bellows-type flexible hose and with a variety of materials chosen for their characteristics of strength, resiliency, elasticity, thermal performance and resistance to the corrosive effects of exhaust gases and the environment. Typically, connections must be made between rigid pipes, including exhaust manifolds, muffler pipes, tail pipes, etc., and flexible components such as flexible hose installed for its ability to accommodate vibration and relative movement between the more rigid components. The connections between such different components are often a source of wear and component failure due to differential movement between the connected components.

Exhaust system connections can be accomplished in various ways, including weldments, clamps, etc. Materials such as stainless steel, aluminum, galvanized metal and various alloys have been used to fabricate the exhaust system components in order to reduce the effects of corrosion and rust. However, a problem typically encountered in installing a muffler system relates to pipe edges, which are often square-cut by pipe cutting equipment and which tend to cut and wear other components as they move relative to each other. The potentially damaging effects of such sawed-off pipe ends are typically made worse by vibration and thermal stress associated with operating conditions. Areas contacted by exhaust pipe ends are therefore often the first areas to fail and require component replacement.

Heretofore there has not been available an exhaust system with improved pipe end configurations having the advantages and features of the present invention.

SUMMARY OF THE INVENTION

In the practice of the present invention, a vehicle is provided with an internal combustion engine having an optional turbocharger. An exhaust system includes an exhaust pipe connected to the engine and an emissions pipe which is connected to emission control component, such as a catalytic converter, muffler or resonator. A flexible hose coupling connects the exhaust and emission pipes. The exhaust and emission pipes have ends which are constricted or tapered to form annular clearances with a slightly larger bore of the flexible hose coupling. The exhaust and emission pipes can be connected to the flexible hose coupling in any suitable manner, such as by clamps, weldments and the like. A liner sleeve can be telescopically received in the flexible hose coupling and can in turn telescopically receive the exhaust pipe end for lining a portion of the flexible hose coupling bore.

OBJECTS AND ADVANTAGES OF THE INVENTION

The principle objects and advantages of the invention include: providing a vehicle with an improved exhaust system; providing such an exhaust system with improved pipe end configurations; providing such an exhaust system with pipe end configurations which reduce exhaust system component wear; providing such an exhaust system with pipe end configurations which are tapered to form annular clearances with other exhaust system components; providing such an exhaust system which can reduce the frequency of exhaust system and exhaust component repairs and replacements; providing such exhaust system which can reduce vehicle operating costs; providing such an exhaust system which is adaptable for use with vehicle exhaust systems comprising various types of metal; providing such an exhaust system which is adapted for use with vehicles having turbo charged engines; and providing such an exhaust system which is efficient in operation, capable of a long operating life, economical to manufacture and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1a is an enlarged, fragmentary, cross-sectional view thereof, particularly showing the area enclosed by circle 1a.

FIG. 1b is an enlarged, fragmentary, cross-sectional view thereof, particularly showing the area enclosed by circle 1b.

FIG. 2 is a side elevational view of a vehicle exhaust system with improved pipe end configurations comprising a first modified embodiment of the present invention.

FIG. 2a is a enlarged, fragmentary, cross-sectional view thereof, particularly showing the area enclosed by circle 2a.

FIG. 2b is an enlarged, fragmentary, cross-sectional view thereof, particularly showing the area enclosed by circle 2b in FIG. 1.

FIG. 3a is an enlarged, fragmentary, cross-sectional view thereof, particularly showing the area enclosed by circle 3a in FIG. 3.

FIG. 3b is an enlarged, fragmentary, cross-sectional view thereof, particularly showing the area enclosed by circle 3b in FIG. 3.

FIG. 4 is a side elevational view of a vehicle exhaust system with improved pipe end configurations comprising a third modified embodiment of the present invention.

FIG. 4a is an enlarged, fragmentary, cross-sectional view thereof, particularly showing the area enclosed by circle 4a in FIG. 4.

FIG. 4b is an enlarged, fragmentary, cross-sectional view thereof, particularly showing the area enclosed by circle 4b in FIG. 4.

DETAILED DESCRIPTION OF THE PREFERRED EMBODIMENTS

I. Introduction and Environment

Figure 1:
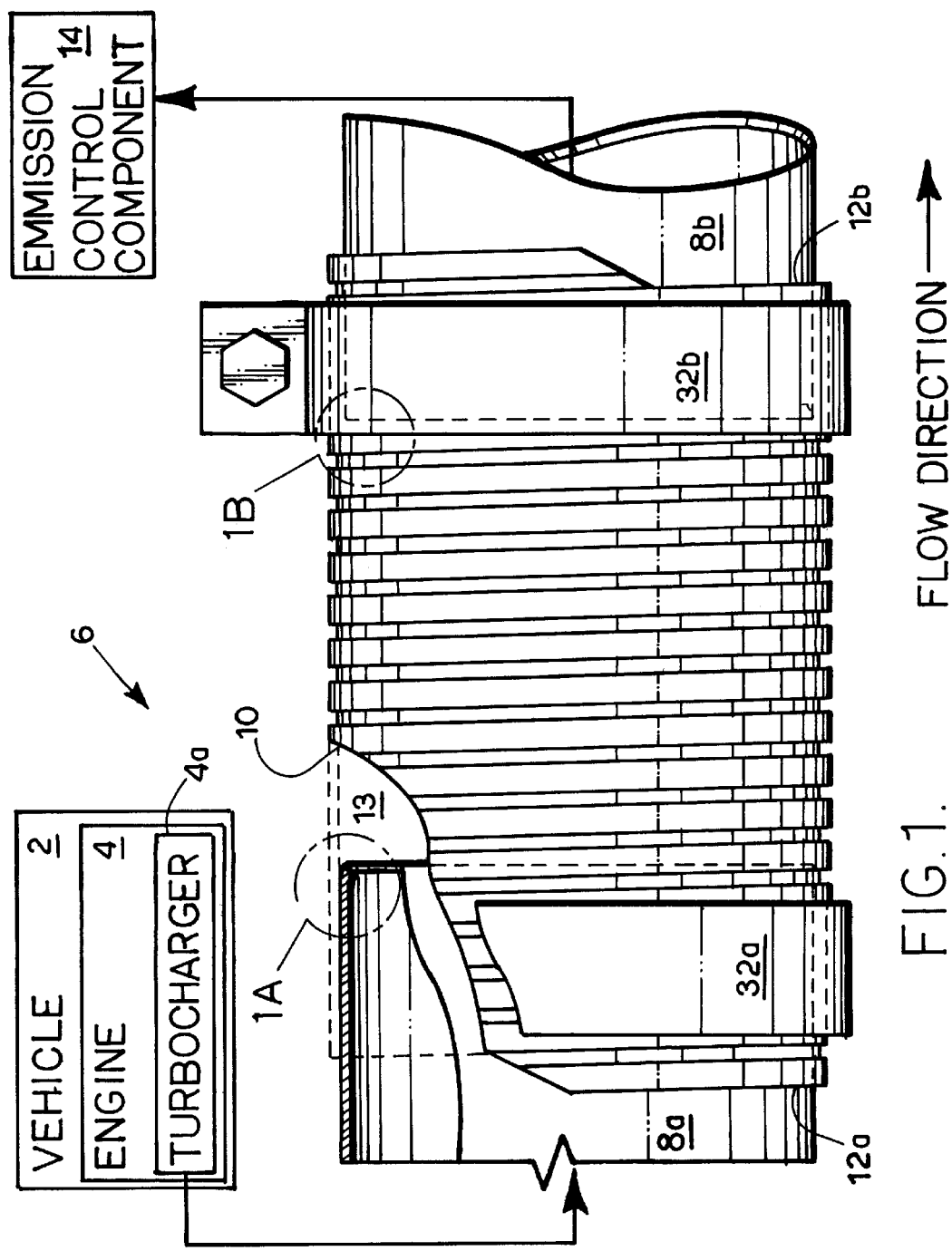
FIG. 1 is a side elevational view of a vehicle exhaust system with improved pipe end configurations embodying the present invention, shown with portions broken away to reveal internal construction.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a vehicle including an internal combustion engine 4, which can include, for example, a turbocharger 4a. An exhaust system 6 includes an exhaust pipe 8 extending in a downstream direction from the turbocharger 4a for communicating exhaust away from the engine 4. The turbocharger 4a can be driven by the exhaust.

II. Vehicle Exhaust System 6

The exhaust system 6 further includes a flexible hose coupling 10 connecting the exhaust pipe 8 to an emission pipe 12 which can be connected to, for example, an emission control component 14. The emission control component 14 can comprise, for example, a muffler, a catalytic converter, a resonator, a tailpipe, etc. The exhaust and emission pipes 8, 12 include respective ends 16a,b.

As shown in FIGS. 1a and 1b, the pipe ends 16a,b have constricted configurations whereat first outside and inside diameters are respectively reduced to second, lesser outside and inside diameters. The exhaust and emission pipes 8a,b have pipe bores 18a,b formed by inner surfaces 20a,b of pipe walls 22a,b, which also include pipe wall outer surfaces 24a,b.

The pipe ends 16a,b have end faces 26a,b formed between inner and outer end edges 28a,b and 30a,b respectively. The end faces 26a,b have generally annular, beveled configurations which converge inwardly and into the respective pipe bores 18a,b whereby the outer end edges 30a,b are located generally flush with the pipe ends 16a,b with the inner end edges 28a,b recessed slightly therefrom. As shown in FIGS. 1a and 1b, the end faces 26 are relatively flat and straight in cross-section and form the end edges 28a,b and 30a,b with approximately ninety degree angles whereby the pipe walls 22a,b have relatively uniform thicknesses.

Annular band clamps 32a,b overlie the flexible hose coupling 10 adjacent to respective hose coupling ends 12a,b. The band clamps 32a,b are located adjacent to the flexible hose coupling ends 12a,b in overlying relation with respect to the pipes 8a,b adjacent to the pipe ends 12a,b respectively for securely clamping the hose coupling 10 on the pipes 8a,b; preferably in a relatively fluid-tight engagement. The flexible hose coupling 10 as shown in FIG. 1 can be formed by spiral-winding a continuous metal band with interlocked leading and trailing edges, or can be formed in a bellows configuration as described below.

In operation, the constricted pipe ends 16a,b minimize damage to the flexible hose coupling 10 as the exhaust system components vibrate with respect to each other and are subjected to thermal stresses associated with the passage of hot exhaust gas. The constricted configurations of the pipe ends 16a,b form annular clearances 34a,b with the hose coupling bore 13, which clearances permit flexure by the flexible hose coupling 10 before the bore 13 thereof would encounter the pipe end outer edges 30a,b.

III. First Modified Embodiment Exhaust System 106

FIGS. 2, 2a and 2b show an exhaust system 106 comprising a first modified embodiment of the invention with a modified pipe end configuration. Exhaust and emission pipes 108a,b have tapered pipe ends 116a,b with radiused, converging transition sections 130a,b forming gradual, rounded transitions between pipe wall outer surfaces 124a,b and radiused pipe end faces 126a,b.

A flexible hose coupling 110 comprises a bellows-type section of flexible hose with annular, alternating lands and grooves 110a,b. The flexible hose coupling 110 is fastened to the pipes 108a,b by annular weldments 132.

In operation, the radiused pipe ends 116 function in a manner similar to the constricted pipe ends 16 to minimize stress in the flexible hose coupling 10, thus prolonging the useful life thereof and reducing its frequency of replacement.

IV. Second Modified Embodiment Exhaust System 206

Figure 3:
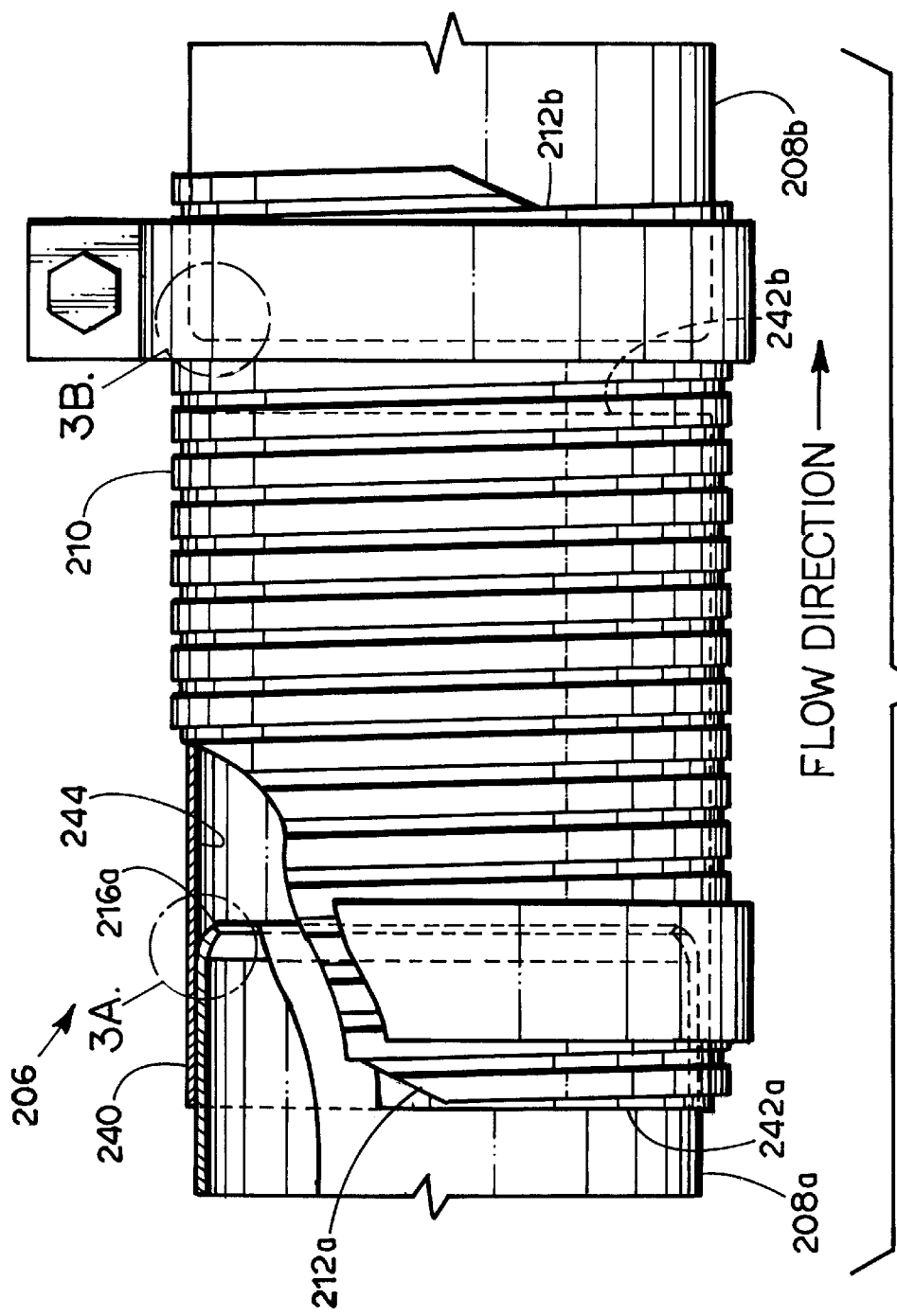
FIG. 3 is a side elevational view of a vehicle exhaust system with improved pipe end configurations comprising a second modified embodiment of the present invention.

FIGS. 3, 3a and 3b show an exhaust system 206 comprising a second modified embodiment of the invention.

The exhaust system 206 includes exhaust and emission pipes 208a,b with constricted ends 216a,b respectively which are similar to the configurations of the pipe ends 16a,b described above. The exhaust system 206 includes a flexible hose coupling 210 with first and second ends 212a,b similar to the spiral-wound flexible hose coupling 10 described above and including flexible hose coupling ends 212a,b.

The exhaust system 206 includes a cylindrical, thin-walled sleeve 240 with first and second sleeve ends 242a,b and a sleeve bore 244 extending therebetween and open thereat. The sleeve 240 can comprise any suitable material, such as stainless steel, and is clamped at its first end 242a between the exhaust pipe 208a and the flexible hose coupling first end 212a. As shown, the sleeve 240 extends generally from the area of the flexible hose coupling first end 212a to its second end 242b, which is located in spaced relation from the second pipe end 216b. The sleeve 240 cooperates with the first constricted pipe end 216a to further protect and isolate the flexible hose coupling 210 from wear and premature failure.

V. Third Modified Embodiment Exhaust System 306

An exhaust system 306 comprising a third modified embodiment of the present invention is shown in FIGS. 4, 4a and 4b and includes exhaust and emission pipes 308a,b with tapered pipe ends 316a,b similar to the tapered pipe ends 116a,b described above. The exhaust system 306 includes a sleeve 340 similar to the sleeve 240 described above. The sleeve 240 is partly positioned between the exhaust pipe 208a and the flexible hose coupling 210.

It is to be understood that while certain forms of the present invention have been illustrated and described herein, it is not to be limited to the specific forms or arrangement of parts described and shown.

What is claimed and desired to be secured by Letters Patent is as follows:

1. An exhaust piping system for a vehicle with an internal combustion engine and an exhaust system with an emission control device, which includes:
    (a) an exhaust pipe connected to the engine and including an end, a bore open at the end, an inside diameter defined by said exhaust pipe bore and an outside diameter;
    (b) an emission pipe connected to the emission control device and including an end, a bore open at the end, an inside diameter defined by said emission pipe bore and an outside diameter;
    (c) said pipe ends being tapered and having reduced outside diameters which are less than said exhaust and emission pipe outside diameters respectively;
    (d) a flexible hose coupling including first and second ends telescopically receiving said exhaust and emission pipe ends respectively and a flexible hose coupling bore extending between said flexible hose coupling ends;
    (e) a sleeve having a generally cylindrical configuration with first and second ends and a sleeve bore extending between and open at said ends;
    (f) said sleeve bore telescopically receiving said first pipe at said sleeve first end;
    (g) said flexible hose coupling bore telescopically receiving said sleeve with said sleeve second end terminating in spaced relation from said second pipe end;
    (h) a first annular clearance formed between said sleeve bore and said reduced-diameter exhaust pipe end;
    (i) a second annular clearance formed between said flexible hose coupling bore and said reduced-diameter emission pipe end;
    (j) first and second band clamps connected to said exhaust and emission pipe ends and to said flexible hose coupling ends respectively; and
    (k) said sleeve first end being retained by said first connection means.

2. The invention according to claim 1, which includes:
    (a) said sleeve comprising stainless steel tubing.

3. The invention according to claim 1, which includes:
    (a) said pipe ends having reduced inside diameters at the ends thereof, each said pipe end having a beveled, annular end face with an outer edge located at a respective pipe end and an inner edge spaced inwardly from said respective pipe end.

4. The invention according to claim 1, wherein each said pipe includes:
    (a) a substantially continuous inside diameter; and
    (b) a side wall with a maximum thickness in spaced relation from a respective pipe end and a reduced thickness adjacent to a respective pipe end.

5. An exhaust piping system, which includes:
    (a) a first pipe including a first pipe end, a first pipe bore open at the end, a first pipe inside diameter defined by said first pipe bore and a first pipe outside diameter;
    (b) a second pipe including a second pipe end, a second pipe bore open at the second pipe end, a second pipe inside diameter defined by said second pipe bore and a second pipe outside diameter;
    (c) said first pipe end being tapered and having a reduced outside diameter less than said first pipe outside diameter;
    (d) a flexible hose coupling including first and second flexible hose coupling ends telescopically receiving said first and second pipe ends respectively and a flexible hose coupling bore extending between said flexible hose coupling ends;
    (e) an annular clearance between said flexible hose coupling bore and said first pipe reduced-diameter end; and
    (f) first and second connection means connecting said first and second pipe ends to said first and second flexible hose coupling ends respectively;
    (g) a sleeve having a generally cylindrical configuration with first and second ends and a sleeve bore extending between and open at said ends;
    (h) said sleeve bore telescopically receiving said first pipe at said sleeve first end; and
    (i) said flexible hose coupling bore telescopically receiving said sleeve with said sleeve second end terminating in spaced relation from said second pipe end; and
    (j) said sleeve first end being retained by said first connection means.

6. The invention according to claim 5, which includes:
    (a) said sleeve comprising stainless steel tubing.

7. An exhaust piping system, which includes:
    (a) a first pipe including a first pipe end with an end face, a first pipe bore open at the end, a first pipe inside diameter defined by said first pipe bore and a first pipe outside diameter;
    (b) a second pipe includidng a second pipe end, a second pipe bore open at the second pipe end, a second pipe inside diameter defined by said second pipe bore and a second pipe outside diameter;
    (c) said first pipe end being tapered and having a reduced outside diameter less than said first pipe outside diameter, wherein said first pipe end face forms an angle of between 0 and 90 degrees with respect to the longitudinal axis of said first pipe;
    (d) a flexible hose coupling including a first and second flexible hose coupling ends telescopically receiving said first and second pipe ends respectively and a flexible hose coupling bore extending between said flexible hose coupling ends;
    (e) an annular clearance between said flexible hose coupling bore and said first pipe reduced-diameter end;
    (f) first and second connection means connecting said first and second pipe ends to said first and second flexible hose coupling ends respectively;
    (g) said first pipe having a reduced inside diameter adjacent to its end;
    (h) said first pipe having a side wall with a constant thickness adjacent to said first pipe end; and (i) said pipe ends being connected solely by said flexible hose coupling which accommodates relative movement between said pipes.

8. An exhaust piping system, which includes:
(a) a first pipe including a first pipe end, a first pipe bore open at the end, a first pipe inside diameter defined by said first pipe bore and a first pipe outside diameter;
(b) a second pipe including a second pipe end, a second pipe bore open at the second pipe end, a second pipe inside diameter defined by said second pipe bore and a second pipe outside diameter;
(c) said first pipe end being tapered and having a reduced outside diameter less than said first pipe outside diameter;
(d) a flexible hose coupling including first and second flexible hose coupling ends telescopically receiving said first and second pipe ends respectively and a flexible hose doupling bore extending between said flexible hose coupling ends;
(e) an annular clearance between said flexiable hose coupling bore and said first pipe reduced-diameter end;
(f) first and second connection means connecting said first and second pipe ends to said first and second flexible hose coupling ends respectively;
(g) said first pipe having a substantially continuous inside diameter adjacent to its end;
(h) a sidewall with a first, maximum thickness is spaced relation from said first pipe end and a second thickness reduced in relation to said first thickness adjacent to said first pipe end forming said tapered end wherein the tapered first pipe end is formed with a radiused converging transition section between an outer surface of said side wall to said first pipe end; and
(i) said pipe ends being connected solely by said flexible hose coupling which accommodates relative movement between said pipes.

\* \* \* \* \*